(12) United States Patent
Kwon et al.

(10) Patent No.: US 11,040,651 B2
(45) Date of Patent: Jun. 22, 2021

(54) MULTIFUNCTIONAL SWITCH DEVICE FOR VEHICLES

(71) Applicant: LS AUTOMOTIVE TECHNOLOGIES CO., LTD., Anyang-si (KR)

(72) Inventors: Soon Hak Kwon, Ansan-si (KR); Seung Hun Shin, Gunpo-si (KR); Jae Chul Lee, Siheung-si (KR); Sung Ho Joo, Ansan-si (KR)

(73) Assignee: LS AUTOMOTIVE TECHNOLOGIES CO., LTD., Anyang-si (KR)

( * ) Notice: Subject to any disclaimer, the term of this patent is extended or adjusted under 35 U.S.C. 154(b) by 62 days.

(21) Appl. No.: 16/476,214

(22) PCT Filed: Dec. 27, 2017

(86) PCT No.: PCT/KR2017/015570
§ 371 (c)(1),
(2) Date: Jul. 5, 2019

(87) PCT Pub. No.: WO2018/128319
PCT Pub. Date: Jul. 12, 2018

(65) Prior Publication Data
US 2019/0366913 A1 Dec. 5, 2019

(30) Foreign Application Priority Data

Jan. 9, 2017 (KR) .................. 10-2017-0003034
Jan. 25, 2017 (KR) .................. 10-2017-0012209

(51) Int. Cl.
*B60Q 1/42* (2006.01)
*B60Q 1/00* (2006.01)
*B60R 16/00* (2006.01)

(52) U.S. Cl.
CPC ............. *B60Q 1/42* (2013.01); *B60Q 1/0082* (2013.01); *B60R 16/005* (2013.01)

(58) Field of Classification Search
None
See application file for complete search history.

(56) References Cited

U.S. PATENT DOCUMENTS 6,737,599 B1 * 5/2004 Lewis ................. H01H 3/60
200/275
7,381,914 B1 * 6/2008 Plesko ................. H01H 3/38
200/341

FOREIGN PATENT DOCUMENTS

JP H06-127305 A 5/1994
JP H10-064371 A 3/1998
(Continued)

*Primary Examiner* — Felix O Figueroa
(74) *Attorney, Agent, or Firm* — Rabin & Berdo, P.C.

(57) ABSTRACT

A multifunctional switch device for a vehicle includes a housing coupled to one side of the steering column, a lever switch protrudingly mounted on one side of the housing so as to be rotatably manipulated within a predetermined section range, a moving block disposed within the housing so as to be rotatably moved together with the lever switch, a retaining block being provided at one side of the moving block, a guide bush mounted at one side of the steering column so as to rotate together with the steering wheel, and a cancel cam configured to be operated by the guide bush depending on a manipulated state of the steering wheel to return the moving block that has been rotatably moved to its original position. The cancel cam includes a cam body rotatably coupled to the housing and a shock-absorbing rib elastically deformably disposed at the cam body.

9 Claims, 5 Drawing Sheets

(56) References Cited

FOREIGN PATENT DOCUMENTS

| | | | |
|---|---|---|---|
| JP | 2006-347447 | A | 12/2006 |
| JP | 2008-251215 | A | 10/2008 |
| KR | 20-0467275 | Y1 | 6/2013 |

* cited by examiner

MULTIFUNCTIONAL SWITCH DEVICE FOR VEHICLES

TECHNICAL FIELD

The present invention relates to a multifunctional switch device for a vehicle, and more particularly, to a multifunctional switch device for a vehicle, which can reduce noise generation caused by collision between components according to the operation of a steering wheel after the activation of a turn signal generated from a lever switch.

BACKGROUND ART

In general, a steering wheel assembly for vehicles includes a steering wheel, a steering column, a steering roll connector assembly, a multi-function switch, and the like. The steering wheel is intended to allow a driver to set the steering direction. The rotation of the steering wheel by the driver is transferred to vehicle wheels through the steering column so that the steering angle of the vehicle is set.

In the meantime, a vehicle such as an automobile requires functions of various kinds of convenient means for offering a more stable and comfortable driving state, beyond a function of the vehicle as a means of transportation. Thus, the vehicle includes diverse convenient devices and various switches for operating and controlling such convenient devices. These various switches tend to be intensively mounted on a steering wheel assembly in consideration of a driver's switch manipulability.

For example, the steering wheel assembly of a vehicle which is recently produced includes a window switch for opening or closing a window, a steering light switch for turning on or off a steering light, an audio switch for driving an audio device, a wiper switch for driving a wiper, and the like.

A multi-functional switch includes a light, a fog lamp, a wiper, various audio devices, a vehicle window switch, and the like. The multi-functional switch serves to prevent the driver's driving attention from being dissipated even during manipulation of a wide variety of devices by increasing the manipulability of the various devices. The multi-functional switch is implemented as a button switch mounted on a top of the steering wheel, or a lever switch mounted on a side of the steering wheel. The multi-functional switch serves to stepwisely decrease the restoring force of a turn signal lever at a plurality of positions to prevent an overrun and a restoring force lack of the turn signal lever when the turn signal lever returns to a neutral position.

FIG. 1 is a schematic view illustrating a conventional multifunctional switch device for a vehicle according to the prior art, and FIG. 2 is a schematic view illustrating a conventional multifunctional switch device for a vehicle according to the prior art, from which a cover has been removed.

Referring to FIGS. 1 and 2, the conventional multifunctional switch device for a vehicle includes a housing 110, a guide bush 120 coupled to a steering column penetrating through the housing 110, a lever switch 130 inserted into one side of the housing 110, a moving block 140 coupled to the lever switch 130 within in the housing 110 so as to rotate together with the lever switch 130, a retaining member 150 coupled to one side of the moving block 140, and a cancel cam 160 disposed between the retaining member 150 and the guide bush 120.

The housing 110 includes a cover 111 through which a steering shaft of a steering column penetrates, and a body 112 coupled to the cover 111 and disposed within the moving block 140 and the cancel cam 160. The cover 111 serves to rotatably support a rotary shaft of the moving block 140 and movably support a rotary shaft of the cancel cam 160. The lever switch 130 is rotatably inserted into one side of the housing 110.

The guide bush 120 is coupled to the steering shaft penetrating through the housing 110, and can be brought into close contact with one end of the cancel cam 160 through the rotation thereof. The guide bush 120 is rotated by a driver's manipulation thereby after the activation of a turn signal so that when the driving direction of a vehicle is changed, the guide bush 120 can be brought into close contact with the cancel cam 160 to rotate the cancel cam 160.

The lever switch 130 includes a manipulating lever 131 rotatably disposed at one side of the housing 110, and a lever shaft 132 coupled at one thereof to the manipulating lever 131 and inserted at the other end thereof into the housing 110 so as to be coupled to the moving block 140. The lever switch 130 is rotated by the driver's manipulation thereof to activate the turn signal.

When the driver rotatably manipulates the lever switch 130, the moving block 140 coupled to the lever shaft 132 rotates together with the lever switch 130. At this point, the retaining member 150 coupled to the moving block 140 rotates together with the lever switch 130, and any one of both ends of the retaining member 150 becomes closer to the cancel cam 160. One end of the cancel cam 160 is rotated by the rotation of the guide bush 120, caused by the operation of the steering column in a state of being in close contact with the guide bush 120, and the other end of the cancel cam 160 is brought into close contact with the retaining member 150. Thus, the cancel cam 160 is rotated together with the rotation of the steering column, and rotates the moving block 140 in a direction opposite to that of rotation upon the activation of the turn signal so that the lever switch 130 returns to a neutral position. This operation is called a return function.

Such a conventional multifunctional switch device for a vehicle entails a problem in that when the steering wheel is rotated forwardly in a direction where the lever switch 130 is manipulated in a state of being rotated to generate a turn signal, the cancel cam collides against the retaining member 150 to generate a noise. Further, the retaining member 150 and the cancel cam 160 may be damaged by an impact during the collusion between the retaining member 150 and the cancel cam 160.

In an effort to solve this problem, the conventional multifunctional switch device for a vehicle employed a method in which a lubricant or grease is applied on a collision occurring part of the multifunctional switch device to prevent the generation of the noise. However, this method still involves a problem in that the lubricant flows down from the collision occurring part by high heat, or the lubricant is exhausted completely when in use for a long period of time.

DISCLOSURE OF INVENTION

Technical Problem

Accordingly, the present invention has been made to solve the above-mentioned problems occurring in the prior art, and it is an object of the present invention to provide a multifunctional switch device for a vehicle, which can reduce noise generation caused by collision between components according to the operation of the steering wheel after the activation of a turn signal generated from a lever switch through a structural modification of a simple component without using lubricating oil.

Technical Solution

To achieve the above object, the present invention provides a multifunctional switch device for a vehicle, which is rotatably coupled to a steering column to generate a turn signal of the vehicle, and is operated to return to its original position in response to the manipulation of a steering wheel, the multifunctional switch device comprising: a housing coupled to one side of the steering column; a lever switch protrudingly mounted on one side of the housing so as to be rotatably manipulated within a predetermined section range; a moving block disposed within the housing so as to be rotatably moved together with the lever switch, a retaining block being provided at one side of the moving block; a guide bush mounted at one side of the steering column so as to rotate together with the steering wheel; and a cancel cam; configured to be operated by the guide bush depending on a manipulated state of the steering wheel to return the moving block that has been rotatably moved to its original position, the cancel cam including a cam body rotatably coupled to the housing so that the cam body can be brought at one end thereof into contact with the retaining block, and a shock-absorbing rib elastically deformably disposed at the cam body so that when the cam body is rotated, the shock-absorbing rib can be brought into close contact with the retaining block earlier than the cam body to absorb the shock caused by a collision between the retaining block and the cam body.

In the multifunctional switch device, the cam body of the cancel cam may include: a rotatable coupling part rotatably coupled to the housing by a rotary shaft; a guide bush contact part formed extending from the rotatable coupling part toward the guide bush so as to be brought into close contact with the guide bush; and a retaining block contact part formed extending from the rotatable coupling part toward the retaining block so as to be brought into close contact with the retaining block. The shock-absorbing rib may be formed extending from the rotatable coupling part toward the retaining block contact part so as to be spaced apart from the retaining block contact part.

In the multifunctional switch device, the retaining block may be provided in a pair at both sides of the retaining block contact part in such a manner that the pair of retaining blocks are spaced apart from each other, and the shock-absorbing rib may be provided in a pair at both sides of the retaining block contact part in such a manner that the pair of shock-absorbing ribs are connected to the rotatable coupling part.

In the multifunctional switch device, preferably, the length of the shock-absorbing rib extending from the rotatable coupling part may be shorter than that of the retaining block contact part extending from the rotatable coupling part.

In the multifunctional switch device, the retaining block contact part may include: a neck portion connected to the rotatable coupling part; and a head portion formed at a distal end of the neck portion so as to be brought into close contact with the retaining block, the width of the head portion being larger than that of the neck portion.

In the multifunctional switch device, preferably, the length of the shock-absorbing rib extending from the rotatable coupling part may be equal to or smaller than that of the neck portion extending from the rotatable coupling part.

In the multifunctional switch device, the cam body of the cancel cam may include: a rotatable coupling part rotatably coupled to the housing by a rotary shaft; a guide bush contact part formed extending from the rotatable coupling part toward the guide bush so as to be brought into close contact with the guide bush; and a retaining block contact part formed extending from the rotatable coupling part toward the retaining block so as to be brought into close contact with the retaining block. The shock-absorbing rib may be disposed at a side of the retaining block contact part so as to be tilted toward the retaining block.

In the multifunctional switch device, the retaining block may be provided in a pair at both sides of the retaining block contact part of the cancel cam in such a manner that the pair of retaining blocks are spaced apart from each other, and the shock-absorbing rib may be provided in a pair at both sides of the retaining block contact part so that the pair of shock-absorbing ribs can be brought into close contact with the pair of retaining blocks, respectively.

In the multifunctional switch device, the cam body of the cancel cam may include: a rotatable coupling part rotatably coupled to the housing by a rotary shaft; a guide bush contact part formed extending from the rotatable coupling part toward the guide bush so as to be brought into close contact with the guide bush; and a retaining block contact part formed extending from the rotatable coupling part toward the retaining block so as to be brought into close contact with the retaining block. The shock-absorbing rib may be disposed at a distal end of the retaining block contact part so as to be tilted toward the rotatable coupling part.

In the multifunctional switch device, the retaining block may be provided in a pair at both sides of the retaining block contact part of the cancel cam in such a manner that the pair of retaining blocks are spaced apart from each other, and the shock-absorbing rib may be provided in a pair at a distal end of the retaining block contact part so that the pair of shock-absorbing ribs can be brought into close contact with the pair of retaining blocks, respectively.

Advantageous Effects

The multifunctional switch device for a vehicle according to the embodiments of the present invention as constructed above have the following advantageous effects.

The multifunctional switch device for a vehicle according to the present invention enables the shock-absorbing rib of the cancel cam to be elastically deformed by being brought into close contact with the retaining block earlier than the retaining block contact part when the retaining member and the cancel cam collide with each other so that a shock caused by the collision can be reduced. In addition, by virtue of this operation of the shock-absorbing rib, a noise generated upon the collision between the retaining member and the cancel cam can be reduced.

In addition, the multifunctional switch device for a vehicle according to the present invention can reduce a shock caused by the collision between components when performing a return function of returning the lever switch to a neutral position, thereby addressing the problems of damage and lifespan shortage of components due to the use thereof for a long period of time.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Now, preferred embodiments of a multifunctional switch device for a vehicle according to the present invention will be described hereinafter in detail with reference to the accompanying drawings.

Figure 1:
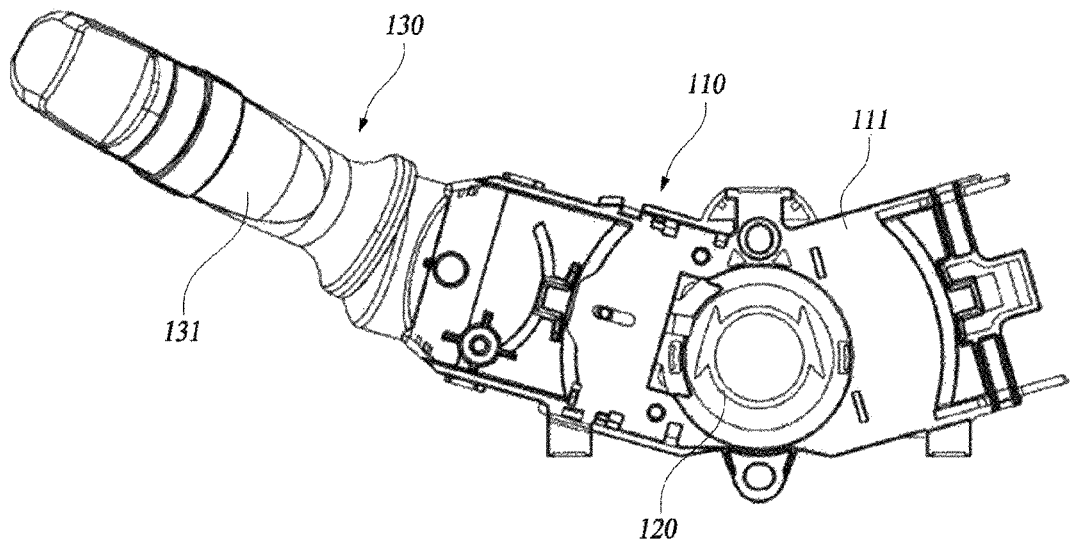
FIG. 1 is a schematic view illustrating a conventional multifunctional switch device for a vehicle according to the prior art.
Figure 2:
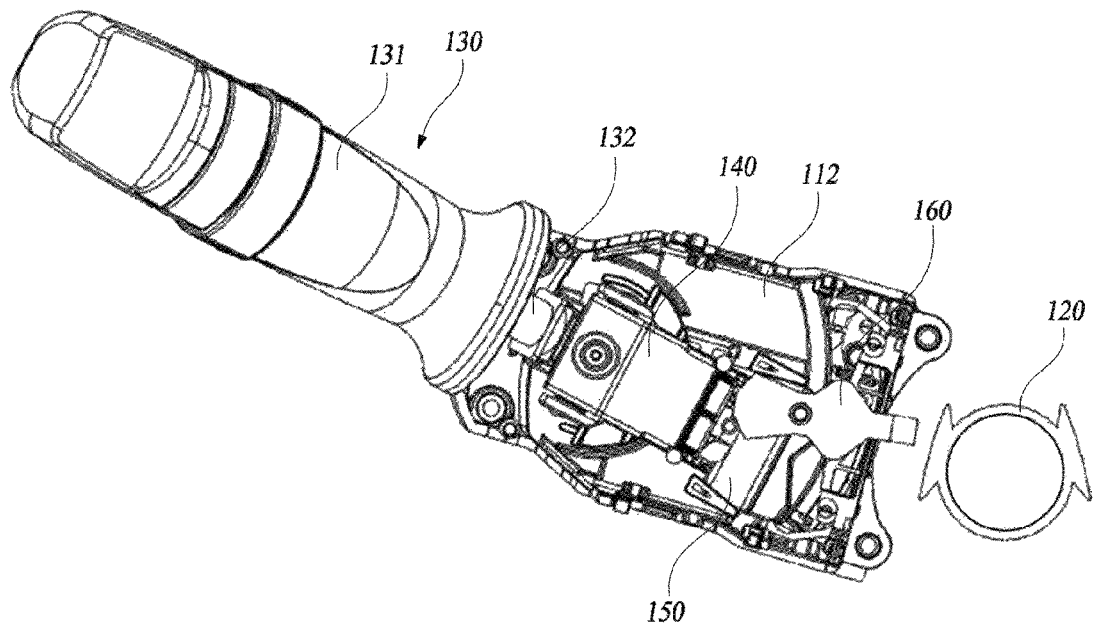
FIG. 2 is a schematic view illustrating a conventional multifunctional switch device for a vehicle according to the prior art, from which a cover has been removed.
Figure 3:
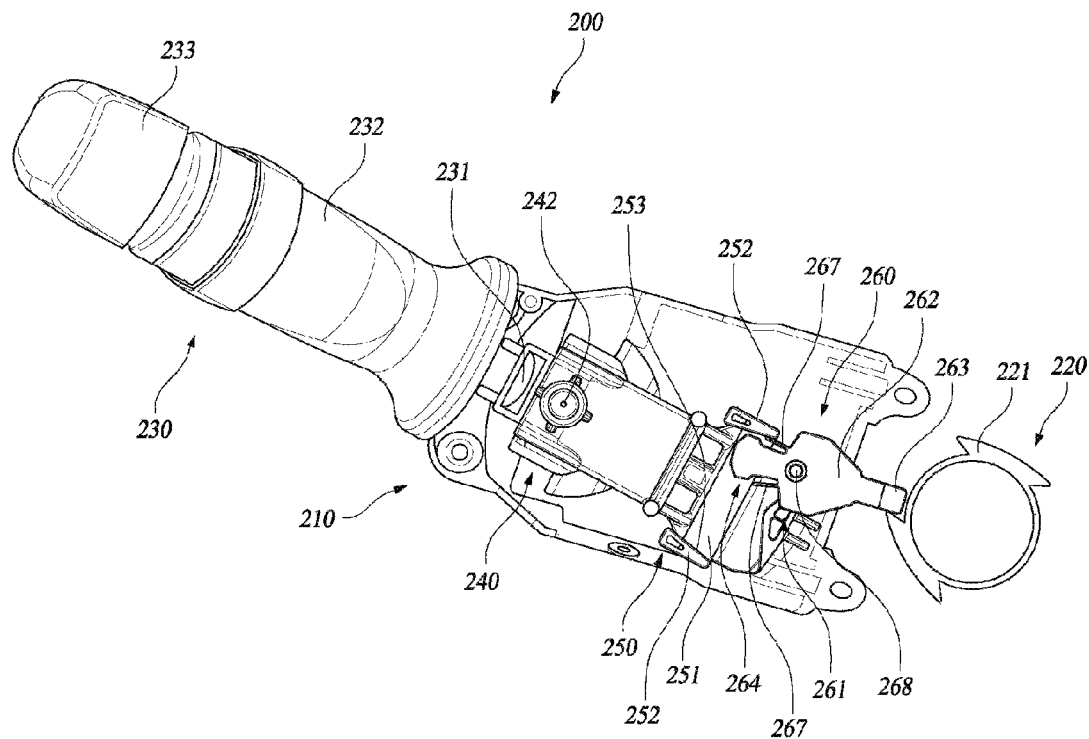
FIG. 3 is a schematic view illustrating a multifunctional switch device for a vehicle according to one embodiment of the present invention.
Figure 4:
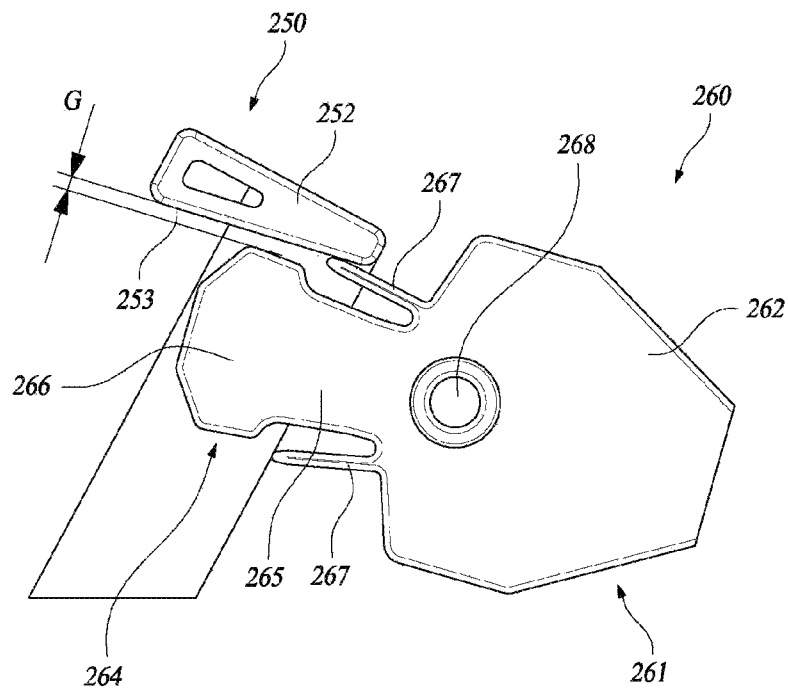
FIG. 4 is an enlarged schematic view illustrating the main elements of a multifunctional switch device for a vehicle according to one embodiment of the present invention.
Figure 5:
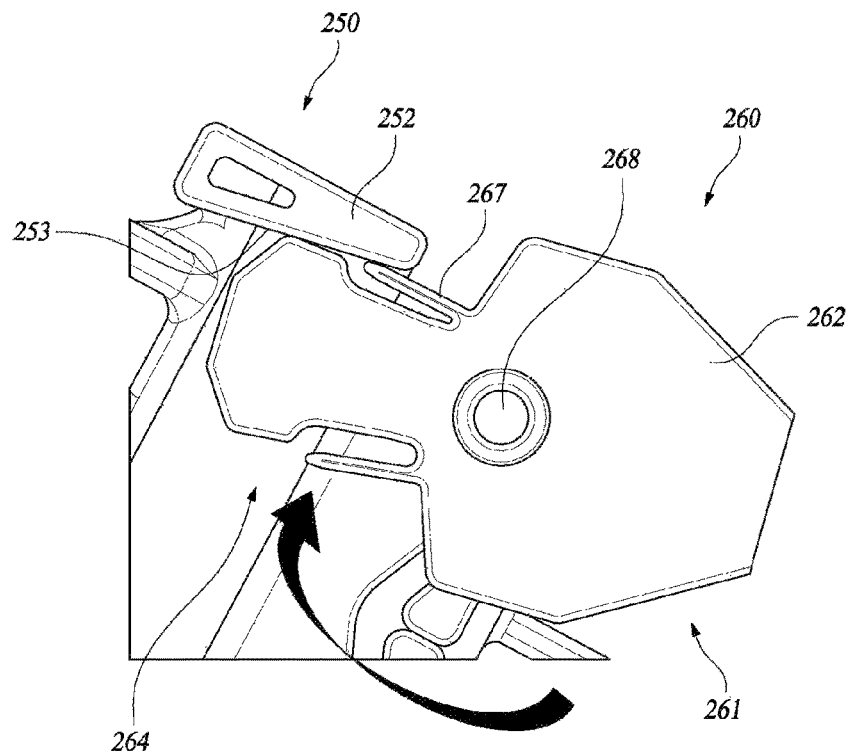
FIG. 5 is a schematic view illustrating a state in which a cancel cam and a retaining member are in close contact with each other in a multifunctional switch device for a vehicle according to one embodiment of the present invention.

FIG. 3 is a schematic view illustrating a multifunctional switch device for a vehicle according to one embodiment of the present invention, FIG. 4 is an enlarged schematic view illustrating the main elements of a multifunctional switch device for a vehicle according to one embodiment of the present invention, and FIG. 5 is a schematic view illustrating a state in which a cancel cam and a retaining member are in close contact with each other in a multifunctional switch device for a vehicle according to one embodiment of the present invention.

Referring to FIGS. 3 to 5, the multifunctional switch device for a vehicle according to one embodiment of the present invention includes a housing 210, a guide bush 220 coupled to a steering column penetrating through the housing 210, a lever switch 230 rotatably mounted to one side of the housing 210, a moving block 240 coupled to the lever switch 230 within in the housing 210 so as to rotate together with the lever switch 230, a retaining member 250 coupled to one side of the moving block 240, and a cancel cam 260 disposed between the retaining member 250 and the guide bush 220.

The housing 210 is coupled to one side of the steering column (not shown) so as to be positioned below the steering wheel (not shown). The housing 210 can have a structure in which a through-hole is formed at the center of the housing so as to allow a steering shaft of the steering column to pass therethrough, and the guide bush 220 coupled to the steering shaft can be disposed in the through-hole of the housing 210. The housing 210 can be composed of an upper housing and a lower housing so that an internal accommodation space is defined therebetween.

The guide bush 220 is coupled to the steering shaft penetrating through the housing 210 so that it can be rotated together with the steering shaft and can be brought into close contact with one end of the cancel cam 160 through the rotation thereof. The guide bush 120 is rotated by a driver's manipulation thereby after the activation of a turn signal so that when the driving direction of a vehicle is changed, the guide bush 120 can be brought into close contact with the cancel cam 160 to rotate the cancel cam 160. The guide bush 120 includes a pressing protrusion 221 provided on an outer circumferential surface thereof so that the pressing protrusion 221 can be brought into close contact with the cancel cam 260 to press the cancel cam 260 according to a rotatably manipulated state of the steering wheel.

The lever switch 230 is rotatably disposed at one side of the housing 210, and can be operated by a driver's manipulation thereof to generate a turn signal. The lever switch 230 may have a structure in which it can manipulate an external lighting device or an internal convenient device of the vehicle besides the turn signal. The lever switch 230 includes a lever shaft 231 coupled to the moving block 240, a manipulating lever 232 coupled to the lever shaft 231 so as to be disposed at the outside of the housing 210 to allow a user to manipulate the manipulating lever 232, and a rotary switch 233 coupled to a distal end of the manipulating lever 232. The rotary switch 233 can be rotated about a longitudinal segment of the lever switch 230, which serves as a rotary center axis, to generate a switching signal. The rotary switch 233 can be rotated about a segment parallel with the steering shaft, which serves as a rotary center axis, within a predetermined angle range in a vertical direction, and can be tilted about a segment perpendicular to the steering shaft, which serves as a rotary center axis, within a predetermined angle range in a forward and backward direction on a virtual plane perpendicular to the steering wheel. Besides, the lever switch 230 may have various structures that can generate a variety of switching signals, including the turn signal.

The moving block 240 is rotatably mounted by a rotary shaft 242 within the housing 210 so as to rotate together with the lever switch 230. The moving block 240 is coupled at one end thereof to the lever shaft 231 of the lever switch 230, and is disposed at the other end thereof at a side of the cancel cam 260 to form a free end.

The retaining member 250 is coupled to the other end of the moving block 240 so as to be moved together with the moving block 240. The retaining member 250 includes a support body 251 coupled to one side of the moving block 240, and a pair of retaining blocks 252 disposed at both ends of the support body 251 so as to be brought into close contact with the cancel cam 260. The retaining blocks 252 are protrudingly formed from one surface of the support body 250, and have a shape which is gradually reduced in width as it goes toward the guide bush 220 side from the lever switch 230 side. The retaining block 252 has a cancel cam contact face 253 formed on the inner side thereof so as to be brought into close contact with the cancel cam 260.

The cancel cam 260 is disposed between the guide bush 220 and the retaining member 250 to provide a return function after the supply of the turn signal. In other words, the cancel cam 260 is simultaneously operated in cooperation with the guide bush 220 connected to the steering wheel and the moving block 240 so as to return the moving block 240 to its original position depending on a manipulated state of the steering wheel in a state in which the moving block 240 has been rotatably moved by the rotatable manipulation of the lever switch 230. An elastic member (not shown) may be connected to the cancel cam 260 to apply an elastic force to the cancel cam 260 so that the cancel cam 260 rotated by the guide bush 220 can return to its original position.

The cancel cam 260 includes a cam body 261 rotatably coupled to the housing 210, and a shock-absorbing rib 267 configured such that when the cam body 261 is rotated, the shock-absorbing rib 267 can be brought into close contact with the retaining block 252 of the retaining member 250 earlier than the cam body 261 to absorb the shock caused by a collision between the retaining block 252 and the cam body 261. The shock-absorbing rib 267 is elastically deformably disposed at the cam body 261.

The cam body 261 of the cancel cam 260 includes a rotatable coupling part 262 rotatably coupled to the housing 210 by a rotary shaft 268, a guide bush contact part 263 extending from the rotatable coupling part 262 to the guide bush 220 so as to be brought into close contact with the guide bush 220, and a retaining block contact part 264 extending from the rotatable coupling part 262 to the retaining member 250 so as to be brought into close contact with the retaining block 252 of the retaining member 250. The retaining block contact part 264 includes a neck portion 265 connected to the rotatable coupling part 262 and a head portion 266 formed at a distal end of the neck portion 265 so as to be brought into close contact with the retaining block 252. The width of the head portion 266 is larger than that of the neck portion 265. The cam body 261 is rotated about the rotary shaft 268 when the pressing protrusion 221 of the guide bush 220 is brought into close contact with the guide bush contact part 263 so that the retaining block contact part 264 can be brought into close contact with any one of the two retaining blocks 252 of the retaining member 250. In other words, as shown in FIG. 5, the head portion 266 of the retaining block contact part 264 can press the moving block 240 in a return direction while being in close contact with the cancel cam contact face 253 of the retaining block 252.

The shock-absorbing rib 267 is formed at one side of the rotatable coupling part 262 so as to extend in an extending direction of the retaining block contact part 264. The shock-absorbing rib 267 is elastically deformed by being brought into close contact with the retaining block 252 earlier than the cam body 261 when the cam body 261 is rotated so that the shock caused by a collision between the retaining block 252 and the cam body 261 can be alleviated. The shock-absorbing rib 267 is provided in a pair at both sides of the retaining block contact part 264 so as to be spaced apart from the retaining block contact part 264. One of two shock-absorbing ribs 267 is brought into close contact with one of two retaining blocks 252 disposed at the moving block 240 when the cam body 261 is rotated in one direction, and the other of two shock-absorbing ribs 267 is brought into close contact with the other of two retaining blocks 252 when the cam body 261 is rotated in the other direction so as to perform a shock-absorbing function.

The shock-absorbing rib 267 is formed in a bar shape which extends slightly tiltedly from an outer surface of the rotatable coupling part 262 toward the retaining block 252 with respect to a longitudinal segment of the cam body 261. The length of the shock-absorbing rib 267 is shorter than that of the retaining block contact part 264. Thus, as shown in FIG. 4, the head portion 266 of the retaining block contact part 264 is spaced apart from the retaining block 252 before the shock-absorbing rib 267 is deformed by being brought into close contact with the cancel cam contact face 253 of the retaining block 252. In other words, a predetermined gap G exists between the cancel cam contact face 253 of the retaining block 252 and the head portion 266 of the retaining block contact part 264 at a time point when the shock-absorbing rib 267 is brought into close contact with the retaining block 252. The size of the gap G can be changed depending on the length of each of the retaining block contact part 264 and the shock-absorbing rib 267, or the gradient of the shock-absorbing rib 267. Herein, the length of the retaining block contact part 264 means a distance from a portion where the neck portion 265 starts to be protruded from the outer surface of the rotatable coupling part 262, to a distal end of the head portion 266. In addition, the length of the shock-absorbing rib 267 means a distance from a portion where the shock-absorbing rib starts to be protruded from the outer surface of the rotatable coupling part 262, to a distal end of the shock-absorbing rib.

Preferably, the length of the shock-absorbing rib 267 protruded from the rotatable coupling part 262 is equal to or smaller than that of the neck portion 265 protruded from the rotatable coupling part 262. If the length of the shock-absorbing rib 267 is longer than that of the neck portion 265, the shock-absorbing rib 267 may interfere with the head portion 266 when the head portion 266 approaches the retaining member 250. Of course, the length of the shock-absorbing rib 267 can be set in various manners.

The operation of the multifunctional switch device 200 for a vehicle according to the present invention will be described in detail hereinafter.

When the lever switch 230 is rotatably manipulated by a driver, the moving block 240 is also rotated together with the lever switch 230, at which time one of the two retaining blocks 252 disposed at the moving block 240 approaches the cancel cam 260. In this state, when the steering wheel is rotated in a direction reverse to the direction of the rotatable manipulation of the lever switch 230, the guide bush 220 is rotated in the same direction as the rotation direction of the steering wheel. Thus, the pressing protrusion 221 of the guide bush 220 is brought into close contact with the guide bush contact part 263 of the cancel cam 260 to rotate the cancel cam 260. In this process, the retaining block contact part 264 of the cancel cam 260 presses against the retaining block 252 of the moving block 240 to rotate the moving block 240 so that the lever switch 230 can return to its original position.

On the other hand, when the steering wheel is rotated in the same direction as the rotation direction of the lever switch 230 in a state where the lever switch 230 has been rotatably manipulated, the cancel cam 260 is rotated in the direction going far away from the retaining block 252 to which the retaining block contact part 264 is adjacent when the pressing protrusion 221 of the guide bush 220 is brought into close contact with the guide bush contact part 263 of the cancel cam 260, so that the moving block 240 is no longer moved. In this state, when the guide bush 220 is further rotated to cause the pressing protrusion 221 to go far away from the cancel cam 260, the cancel cam 260 returns to a neutral position by an elastic force of the elastic member. At this point, the retaining block contact part 264 of the cancel cam 260 collides with the retaining block 252.

In the process in which the retaining block contact part 264 of the cancel cam 260 collides with the retaining block 252, a noise caused by the collision may be generated. The multifunctional switch device 200 for a vehicle according to the present invention enables the shock-absorbing rib 267 to be elastically deformed by being brought into close contact with the retaining block 252 earlier than the retaining block contact part 264 so that a shock caused by the collision can be reduced. In addition, by virtue of this operation of the shock-absorbing rib 267, a noise generated upon the collision between the retaining member 250 and the cancel cam 260 can be reduced.

The following table shows an experimental result of the comparison between the multifunctional switch device 200 for a vehicle according to the present invention and the conventional technology according to the prior art in terms of a noise reduction effect:

|  | Shock absorption Rib | | | Remarks (mass- |
| --- | --- | --- | --- | --- |
| Test | 1 | 2 | 3 | production) |
| Grease X | 64.2 | 64.7 | 64.5 | 71.4 |
| Grease ○ | 40.4 | 42.1 | 41.3 | 47.1 |

The noise measurement is performed under the experimental conditions, including a background noise condition (36 dB or lower), a sound level meter condition (frequency weighting: A, and time weighting: fast), a mounting condition (noise measurement at a point 200 mm away from a distal end face of the wheel), a rotation method condition (rotation of the wheel in the same direction in T/SIGNAL state), a rotation speed condition (about 60 rpm), a rotation method (manual, rotation error: 10%), a measuring instrument condition (noise tester), and the like.

As can be seen from the above table, the multifunctional switch device 200 for a vehicle according to the present invention generates a smaller noise compared to the conventional multifunctional switch device even if lubricant (grease) is completely exhausted.

Figure 6:
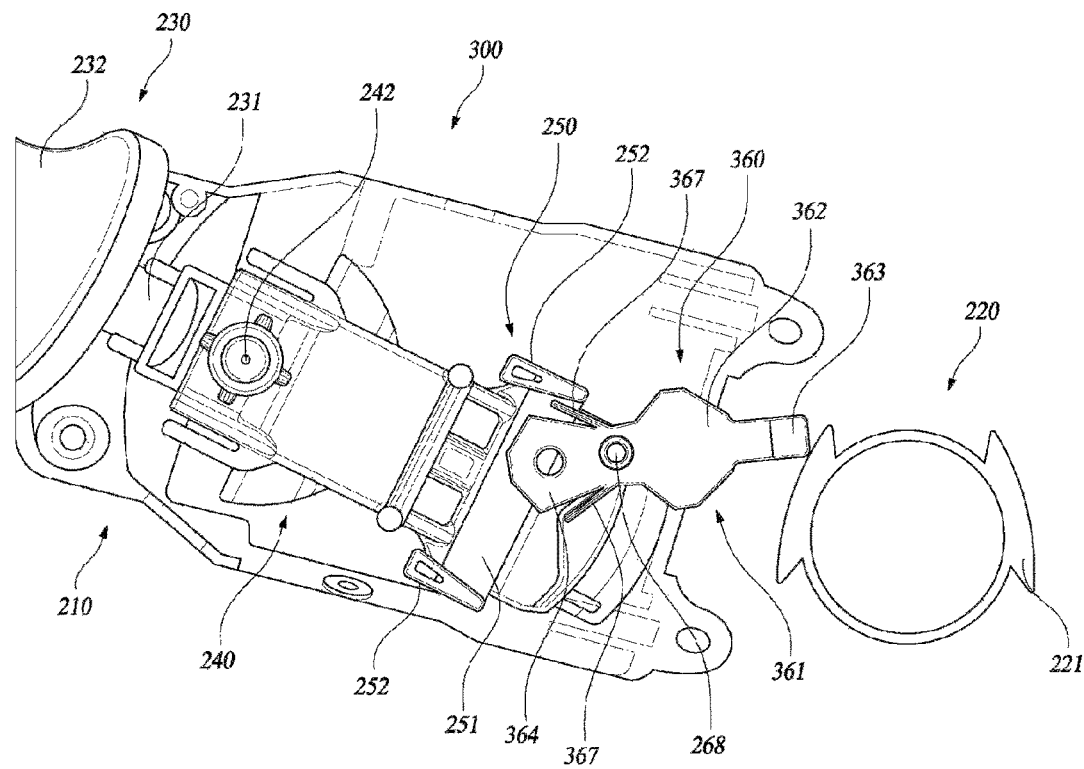
FIG. 6 is a schematic view illustrating a multifunctional switch device for a vehicle according to another embodiment of the present invention.
Figure 7:
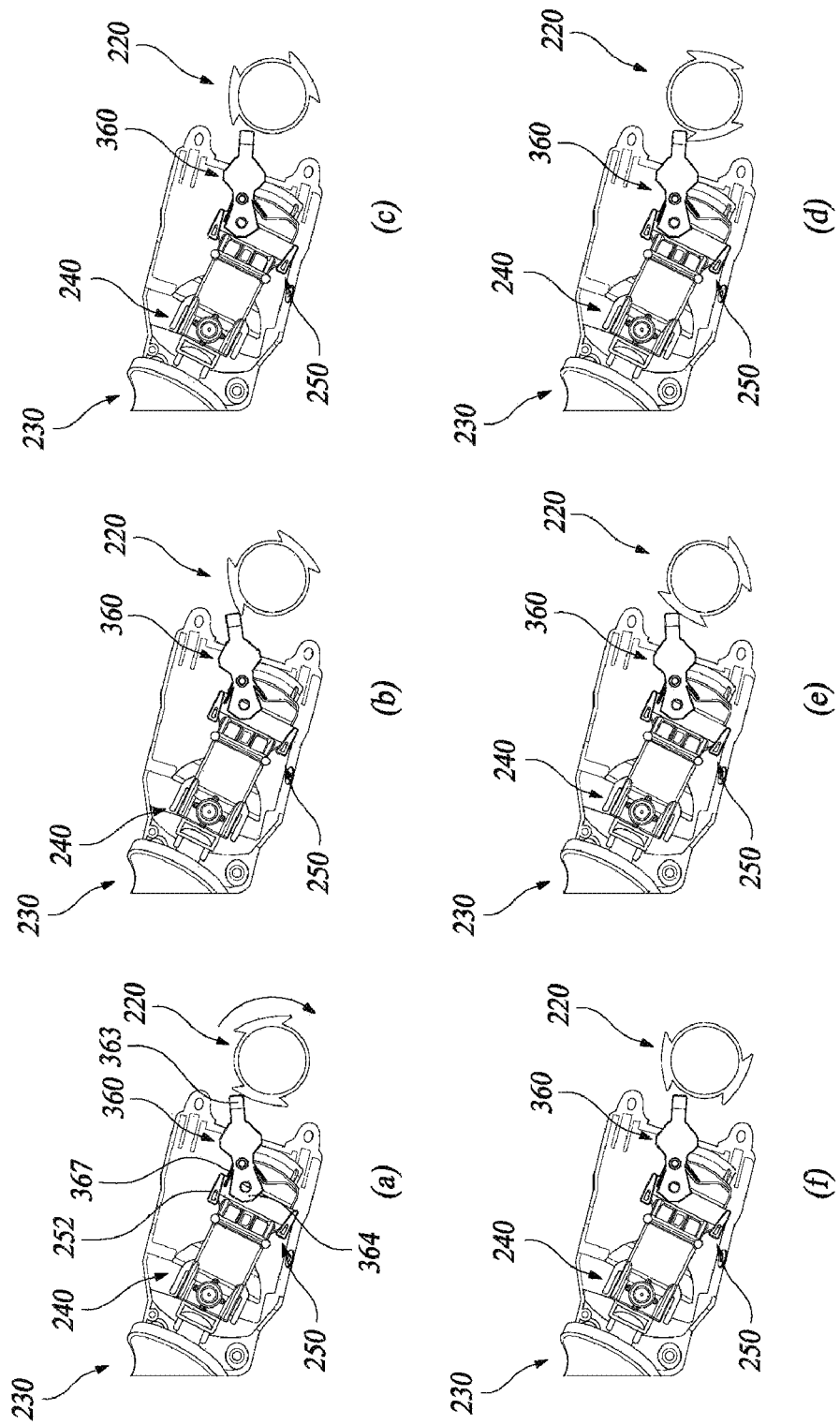
FIG. 7 is a schematic view illustrating the operation of the multifunctional switch device for a vehicle, shown in FIG. 6.

In the meantime, FIG. 6 is a schematic view illustrating a multifunctional switch device for a vehicle according to another embodiment of the present invention, and FIG. 7 is a schematic view illustrating the operation of the multifunctional switch device for a vehicle, shown in FIG. 6.

Figure 8:
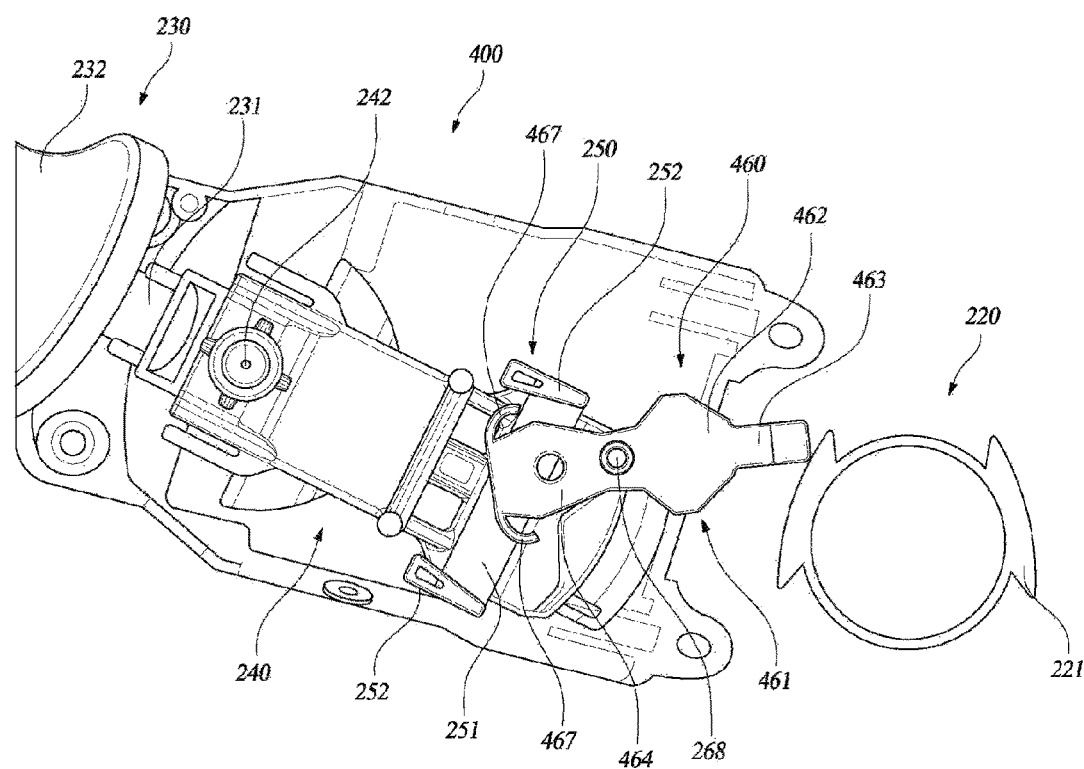
FIG. 8 is a schematic view illustrating a multifunctional switch device for a vehicle according to still another embodiment of the present invention.

FIG. 8 is a schematic view illustrating a multifunctional switch device for a vehicle according to still another embodiment of the present invention.

Referring to FIGS. 6 and 7, the multifunctional switch device 300 for a vehicle according to still another embodiment of the present invention includes a housing 210, a guide bush 220 coupled to a steering column penetrating through the housing 210, a lever switch 230 rotatably mounted to one side of the housing 210, a moving block 240 coupled to the lever switch 230 within in the housing 210 so as to rotate together with the lever switch 230, a retaining member 250 coupled to one side of the moving block 240, and a cancel cam 360 disposed between the retaining member 250 and the guide bush 220. Herein, the remaining constituent elements other than the housing 210, the guide bush 220, the lever switch 230, the moving block 240, the retaining member 250, and the cancel cam 360 are the same as those described above.

The cancel cam 360 includes a cam body 361 rotatably coupled to the housing 210, and a shock-absorbing rib 367 configured such that when the cam body 361 is rotated, the shock-absorbing rib 367 can be brought into close contact with the retaining block 252 of the retaining member 250 earlier than the cam body 361 to absorb the shock caused by a collision between the retaining block 252 and the cam body 361. The shock-absorbing rib 367 is elastically deformably disposed at the cam body 361.

The cam body 361 of the cancel cam 360 includes a rotatable coupling part 362 rotatably coupled to the housing 210 by a rotary shaft 268, a guide bush contact part 363 extending from the rotatable coupling part 362 to the guide bush 220 so as to be brought into close contact with the guide bush 220, and a retaining block contact part 364 extending from the rotatable coupling part 362 to the retaining member 250 so as to be brought into close contact with the retaining block 252 of the retaining member 250.

The shock-absorbing rib 367 is formed extending from a side of the retaining block contact part 364. The shock-absorbing rib 367 is elastically deformed by being brought into close contact with the retaining block 252 earlier than the cam body 361 when the cam body 361 is rotated so that the shock caused by a collision between the retaining block 252 and the cam body 361 can be alleviated. The shock-absorbing rib 367 is provided in a pair at both sides of the retaining block contact part 364. One of two shock-absorbing ribs 367 is brought into close contact with one of two retaining blocks 252 disposed at the moving block 240 when the cam body 361 is rotated in one direction, and the other of two shock-absorbing ribs 367 is brought into close contact with the other of two retaining blocks 252 when the cam body 361 is rotated in the other direction so as to perform a shock-absorbing function.

The shock-absorbing rib 367 is formed in a bar shape which extends slightly tiltedly from an outer surface of the rotatable coupling part 362 toward the retaining block 252 with respect to a longitudinal segment of the cam body 361. The length or gradient of the shock-absorbing rib 367 can be set in various manners.

Hereinafter, the operation of the multifunctional switch device 300 for a vehicle according to another embodiment of the present invention will be described in detail with reference to FIG. 7.

Referring to FIG. 7, in the multifunctional switch device 300 for a vehicle, when a right turn direction indicating lamp is operated in response to a turn signal, the lever switch 230 is manipulated upwardly, and one-side retaining block 252 of the retaining member 250 approaches the cancel cam 360 by the rotation of the lever switch 230, and the guide bush contact part 363 of the cancel cam 360 is brought into close contact with the pressing protrusion 221 of the guide bush 220 (a).

In this case, when a driver rotates the steering wheel in a right-turn direction, the guide bush 220 is also rotated together with the steering wheel, and the cancel cam 360 abutting against the guide bush 220 is rotated in a direction opposite to the rotation direction of the guide bush 20. Thus, the retaining block contact part 364 of the cancel cam 360 goes far away from an adjacent retaining block 252 (b).

When the driver further rotates the steering wheel in the same direction, the pressing protrusion 221 of the guide bush 220 escapes from the guide bush contact part 363 of the cancel cam 360 to cause the cancel cam 360 to return to a neutral position by the elastic member. At this point, the retaining block contact part 364 of the cancel cam 360 collides with the retaining block 252 of the retaining member 250 (c).

When the steering wheel continues to be rotated in a right-turn direction, the cancel cam 360 is again brought into close contact with the outer circumferential surface of the guide bush 220 (d), and is rotated in a direction opposite to the rotation direction of the steering wheel by the pressing protrusion 221 of the guide bush 220 so that the cancel cam 360 is again spaced apart from the retaining block 252 (e).

In this state, when the guide bush 220 is further rotated by the rotation of the steering wheel, it again escapes from the cancel cam 360 which in turn returns to the neutral position by the elastic member. At this point, the retaining block contact part 364 of the cancel cam 360 again collides with the retaining block 252 of the retaining member 250 (*f*).

As such, when the retaining member 250 and the cancel cam 360 collide with each other, the shock-absorbing rib 367 of the cancel cam 360 is elastically deformed by being brought into close contact with the retaining block 252 earlier than the retaining block contact part 364 so that a shock caused by the collision can be reduced. In addition, by virtue of this operation of the shock-absorbing rib 367, a noise generated upon the collision between the retaining member 250 and the cancel cam 360 can be reduced.

Meanwhile, FIG. 8 is a schematic view illustrating a multifunctional switch device for a vehicle according to still another embodiment of the present invention.

Referring to FIG. 8, the multifunctional switch device 400 for a vehicle according to still another embodiment of the present invention includes a housing 210, a guide bush 220 coupled to a steering column penetrating through the housing 210, a lever switch 230 rotatably mounted to one side of the housing 210, a moving block 240 coupled to the lever switch 230 within in the housing 210 so as to rotate together with the lever switch 230, a retaining member 250 coupled to one side of the moving block 240, and a cancel cam 460 disposed between the retaining member 250 and the guide bush 220. Herein, the remaining constituent elements other than the housing 210, the guide bush 220, the lever switch 230, the moving block 240, the retaining member 250, and the cancel cam 460 are the same as those described above.

The cancel cam 460 includes a cam body 461 rotatably coupled to the housing 210, and a shock-absorbing rib 467 configured such that when the cam body 361 is rotated, the shock-absorbing rib 467 can be brought into close contact with the retaining block 252 of the retaining member 250 earlier than the cam body 461 to absorb the shock caused by a collision between the retaining block 252 and the cam body 461. The shock-absorbing rib 467 is elastically deformably disposed at the cam body 461.

The cam body 461 of the cancel cam 460 includes a rotatable coupling part 462 rotatably coupled to the housing 210 by a rotary shaft 268, a guide bush contact part 463 extending from the rotatable coupling part 462 to the guide bush 220 so as to be brought into close contact with the guide bush 220, and a retaining block contact part 464 extending from the rotatable coupling part 462 to the retaining member 250 so as to be brought into close contact with the retaining block 252 of the retaining member 250.

The shock-absorbing rib 467 is formed at a distal end of the retaining block contact part 464. The shock-absorbing rib 467 is elastically deformed by being brought into close contact with the retaining block 252 earlier than the cam body 461 when the cam body 461 is rotated so that the shock caused by a collision between the retaining block 252 and the cam body 461 can be alleviated. The shock-absorbing rib 467 is provided in a pair at a distal end of the retaining block contact part 464 so as to be tilted toward the retaining blocks 252 at both sides of the retaining member 250. The shock-absorbing rib 467 is formed in a bent bar shape so that the shock-absorbing rib 467 can be elastically deformed by being brought into close contact with the retaining block 252 earlier than the retaining block contact part 464 when the cancel cam 460 is rotated. One of two shock-absorbing ribs 467 is brought into close contact with one of two retaining blocks 252 disposed at the moving block 240 when the cam body 461 is rotated in one direction, and the other of two shock-absorbing ribs 467 is brought into close contact with the other of two retaining blocks 252 when the cam body 461 is rotated in the other direction so as to perform a shock-absorbing function.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention.

The invention claimed is:

1. A multifunctional switch device for a vehicle, which is rotatably coupled to a steering column to generate a turn signal of the vehicle, and is operated to return to an original position in response to a manipulation of a steering wheel, the multifunctional switch device comprising:

a housing coupled to one side of the steering column;

a lever switch protrudingly mounted on one side of the housing so as to be rotatably manipulated within a predetermined section range;

a moving block disposed within the housing so as to be rotatably moved together with the lever switch, and including a retaining member disposed at one side of the moving block, the retaining member being provided with a retaining block;

a guide bush mounted at one side of the steering column so as to rotate together with the steering wheel; and a cancel cam configured to be operated by the guide bush depending on a manipulated state of the steering wheel to return the moving block that has been rotatably moved to the original position, the cancel cam including a cam body rotatably coupled to the housing so that the cam body is brought at one end thereof into contact with the retaining block, and a shock-absorbing rib elastically deformably disposed at the cam body so that when the cam body is rotated, the shock-absorbing rib is brought into close contact with the retaining block earlier than the cam body to absorb the shock caused by a collision between the retaining block and the cam body, wherein the cam body of the cancel cam comprises:

a rotatable coupling part rotatably coupled to the housing by a rotary shaft;

a guide bush contact part formed extending from the rotatable coupling part toward the guide bush so as to be brought into close contact with the guide bush; and a retaining block contact part formed extending from the rotatable coupling part toward the retaining block so as to be brought into close contact with the retaining block, wherein the shock-absorbing rib is formed extending from the rotatable coupling part toward the retaining block contact part so as to be spaced apart from the retaining block contact part.

2. The multifunctional switch device for a vehicle according to claim 1, wherein the retaining block is provided in a pair at both sides of the retaining block contact part in such a manner that the pair of retaining blocks are spaced apart from each other, and wherein the shock-absorbing rib is provided in a pair at both sides of the retaining block contact part in such a manner that the pair of shock-absorbing ribs are connected to the rotatable coupling part.

3. The multifunctional switch device for a vehicle according to claim 1, wherein the length of the shock-absorbing rib extending from the rotatable coupling part is shorter than that of the retaining block contact part extending from the rotatable coupling part.

4. The multifunctional switch device for a vehicle according to claim 1, wherein the retaining block contact part comprises:
   a neck portion connected to the rotatable coupling part; and
   a head portion formed at a distal end of the neck portion so as to be brought into close contact with the retaining block, the width of the head portion being larger than that of the neck portion.

5. The multifunctional switch device for a vehicle according to claim 4, wherein the length of the shock-absorbing rib extending from the rotatable coupling part is equal to or smaller than that of the neck portion extending from the rotatable coupling part.

6. The multifunctional switch device for a vehicle according to claim 1, wherein the cam body of the cancel cam comprises:
   a rotatable coupling part rotatably coupled to the housing by a rotary shaft;
   a guide bush contact part formed extending from the rotatable coupling part toward the guide bush so as to be brought into close contact with the guide bush; and
   a retaining block contact part formed extending from the rotatable coupling part toward the retaining block so as to be brought into close contact with the retaining block, and
   wherein the shock-absorbing rib is formed in a bar shape and disposed at a side of the retaining block contact part so as to be tilted toward the retaining block.

7. The multifunctional switch device for a vehicle according to claim 6, wherein the retaining block is provided in a pair at the retaining member so as to be positioned at both sides of the retaining block contact part of the cancel cam in such a manner that the pair of retaining blocks are spaced apart from each other, and
   wherein the shock-absorbing rib is provided in a pair at both sides of the retaining block contact part so that the pair of shock-absorbing ribs is brought into close contact with the pair of retaining blocks, respectively.

8. The multifunctional switch device for a vehicle according to claim 1, wherein the cam body of the cancel cam comprises:
   a rotatable coupling part rotatably coupled to the housing by a rotary shaft;
   a guide bush contact part formed extending from the rotatable coupling part toward the guide bush so as to be brought into close contact with the guide bush; and
   a retaining block contact part formed extending from the rotatable coupling part toward the retaining block so as to be brought into close contact with the retaining block, and
   wherein the shock-absorbing rib is formed in a bent bar shape and disposed at a distal end of the retaining block contact part so as to be tilted toward the rotatable coupling part.

9. The multifunctional switch device for a vehicle according to claim 8, wherein the retaining block is provided in a pair at the retaining member so as to be positioned at both sides of the retaining block contact part of the cancel cam in such a manner that the pair of retaining blocks are spaced apart from each other, and
   wherein the shock-absorbing rib is provided in a pair at a distal end of the retaining block contact part so that the pair of shock-absorbing ribs is brought into close contact with the pair of retaining blocks, respectively.

* * * * *